Oct. 11, 1966          R. J. ROWEKAMP          3,277,883
                   HEAT AND ENERGY ACCUMULATOR
                     Filed Sept. 4, 1963
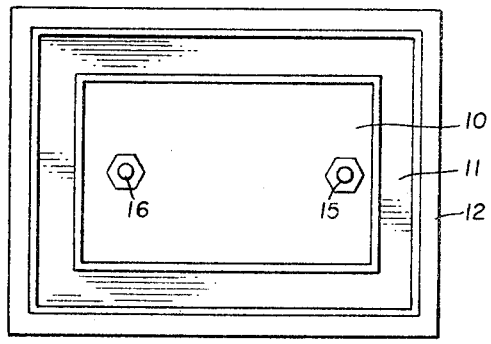
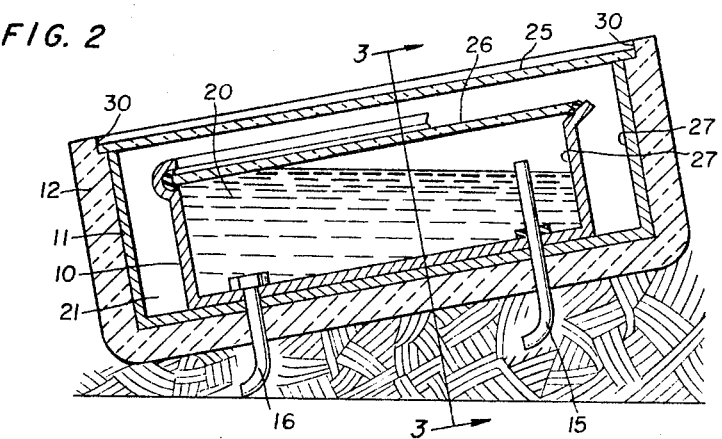
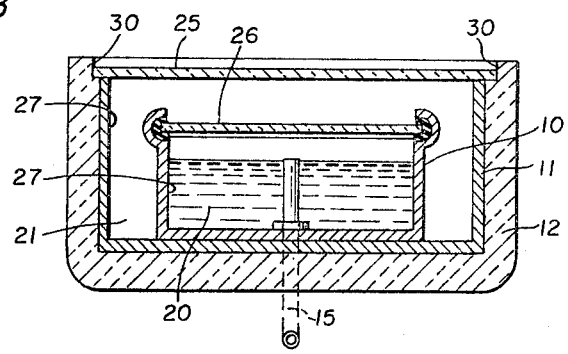
INVENTOR
RICHARD J. ROWEKAMP

United States Patent Office 3,277,883
Patented Oct. 11, 1966

3,277,883
HEAT AND ENERGY ACCUMULATOR
Richard J. Rowekamp, 440 Hilltop Lane, Cincinnati, Ohio
Filed Sept. 4, 1963, Ser. No. 306,640
3 Claims. (Cl. 126—271)

This invention relates to certain improvements made to a solar collector or heat accumulator for heating water in a pan by sunlight, which was filed April 22, 1963, and assigned application Serial No. 274,748, now abandoned. More particularly this invention relates to a double-pan, or a pan-in-a-pan, solar collector which provides such features as a unique double glazing effect, a small pan containing water set within a larger empty pan so that the water in the small pan can be heated by sunlight shining into the pan and by the hot air created in the larger pan. Other improvements include a completely insulated frame molded around the larger or outer pan, a new means of filling and emptying the pan, a way of tilting the pan at a lesser angle so that there can be an air space between the glass cover of the pan containing the water, and a means of turning the aluminum "black" through oxidation by sunlight and water instead of by acid. Other features of the pan described in application Serial No. 274,748, now abandoned remain the same.

Tests of pans at my home in Cincinnati this summer reveal that a pan-in-a-pan solar collector will heat water by sunlight to a much higher temperature than a single pan; a high temperature of 192° F. can be reached on a clear day, and 180° F. on a cloudy day with little sunshine; a single pan produces a high temperature on a clear day of 152° F., and only 115° F. on a partly cloudy day. A single pan could produce hot water for domestic hot water needs; but the double-pan produces the extreme high temperatures desirous for a solar powerplant to generate electricity as described in my application Serial No. 192,390, filed May 4, 1962, now Patent No. 3,152,442. The tests also showed that ordinary aluminum will turn "black" when oxidized by sunlight and water; therefore, the acid process of oxidation possibly could be eliminated. Tests further showed that there may be an advantage of tilting the pans less toward the sun so that an air gap can be left under the glass cover; therefore, a tilt at a ten degree angle might be advisable. Tests also disclosed that insulation definitely results in higher temperatures of the water; therefore in the new double-pan solar collector, the outer pan is completely insulated.

The object of this invention is to incorporate all the improvements mentioned above into a new and better solar collector or heat accumulator that will be especially suited to create a high temperature in water. In desert regions of the world, such a device could boil water; and my type of solar powerplant could convert it into cheap solar electricity.

The above and other object and features of the invention will be apparent to those skilled in the art to which this invention pertains from the following detailed description and the drawings, in which:

FIG. 1 is a schematic plan view showing how a small pan for accumulating solar heat will be set inside a larger pan, and how the insulation fits around the larger pan;

FIG. 2 is an enlarged view in lengthwise sections of the pans and the supports therefor; and FIG. 3 is a view in section taken on the line 3—3 in FIG. 2.

In the following detailed description and drawing, like reference characters indicate like parts.

In FIG. 1 is shown a small pan 10, which is set inside a large pan 11, which is completely enclosed by an insulating cover 12 that is formed integrally about it. The small pan 10 is filled with water by means of inlet pipe 15, and drained by means of outlet pipe 16.

Details of the construction and arrangement of the double-pan, or pan-in-a-pan, solar collector are shown in FIGS. 2 and 3. The small pan 10 sets inside large pan 11, and is constructed exactly as described in application Serial No. 274,748, now abandoned, except that inlet pipe and outlet pipe 16 are connected to it through the base; these two pipes enter the pan 10 from the base, passing also through the base of pan 11 and insulation cover 12; and they are anchored to the base by welding or soldering or the like; they are located as shown in FIG. 1, and also serve to anchor the two pans together.

The small pan 10 is filled with water 20; but the large pan 11 is empty, except for air 21. Sunlight passes thru transparent glass covers 25 and 26 of the two pans, and is absorbed by the black color 27 of the pans, and heats both the water and the air. The hot air in the large pan surrounding the small pan apparently accounts for the extreme heating of the water; the water is heated from the inside of the small pan by the sunlight, and also on the outside by the hot air made by the sunlight in the large pan. Temperatures of 45° F. to 50° F. higher than those reached in a single pan are possible thru this arrangement; 70° water put into the small pan at 8 A.M. will be raised to a temperature of 150° F. by 11 A.M., and to 192°–186° F. by 2:30 P.M. on a clear day, with weather temperatures varying from 75°–83° F. Test pans were not glazed with a sealing compound, so even higher temperatures appear likely. Desert temperatures of 90°–130° F. certainly could make the water boil.

Double glazing of a single pan has also been tested, but this does not produce the extreme high temperatures as obtained from the double pan. Double glazing of a single pan, however, does result in slightly higher temperatures over single glazing, and may prove desirable, especially for the protection of domestic and industrial hot water. Double glazing could easily be occomplished in the large pan 11, if it were used as a single pan, merely by adding another notch or shoulder to the insulation cover 12.

Large pan 11 is completely surrounded by insulation cover 12, except at the top. Here, the pan terminates, and the insulation cover 12 has a notch or shoulder 30, which receives the glass cover 25. The glass cover 25 would be made slightly larger than the notch in insulation cover 12, and can be pressed into place.

The insulation cover 12 would consist of polyurethane resin insulation material or the like, and would be molded around the large pan 11 in the factory.

Both the small pan 10 and the large pan 11 can be formed either of aluminum or black porcelain enamel, either one of which has proved satisfactory in tests. However, any metal with a "black" color could be used in the pans. Aluminum appears to be the cheapest and most practical. If aluminum is used, tests have shown that ordinary aluminum will turn black when oxidized through the action of sunlight and water; and this cheaper method could be used instead of the oxidation with acid as described in my application Serial No. 274,748, now abandoned. However, the addition to the aluminum of certain alloys such as silicones and manganese may produce a better "black" finish.

As indicated above, large pan 11 in combination with insulation cover 12 could be used as a single-pan solar collector or heat accumulator, either with single glazing or double glazing; and if used as such, would be filled with water by inlet pipe 15, and drained by outlet pipe 16. It is the intention in this application to claim such a combination as an improvement over the pan described in my application Serial No. 274,748, now abandoned.

The double-pan solar collector is mounted with the glass covers 25 and 26 sloping slightly downward toward the south if in the Northern Hemisphere (toward the north if in the Southern Hemisphere). In field erection, a large number of the pan assemblies would be butted one against the other, giving support to themselves, and further anchored by inlet and outlet pipes which feed and drain water from them. The angle or slope is made by moving earth with a bulldozer or earth-moving equipment so that the ground slants toward the sun; a ten degree rise in the earth would permit an air gap under the glass and the top of the water in the pan, as shown in FIG. 2.

The heat and energy accumulating device illustrated in the drawing and described above is subject to structural modification without departing from the spirit and scope of the appended claims.

Having described my invention, what I claim as new and desire to secure by Letters Patent, is:

1. A heat accumulator for collecting solar energy in water, which comprises a small aluminum pan set inside a large aluminum pan; said small pan containing the water to be heated by the sun, and the large pan being empty so as to form an air gap around the small pan; both aluminum pans being comprised of a base and side walls, and enclosed respectively by glass covers mounted on the top of said side walls; said aluminum containing alloys such as silicones and manganese which will make the inside of the aluminum pans turn black when oxidized in the presence of water and sunlight; said large pan being completely insulated around the base and side walls by polyurethane resin insulation material which is molded integrally around it, and which has a shoulder completely around the upper portion so that said glass cover for the larger pan can be pressed into it; means for introducing water into the small pan, and means for removing heated water from the small pan; said pan assembly being arranged so that the glass covers slant toward the approximate angle of the sun.

2. A heat accumulator for collecting solar energy in water which comprises a completely insulated pan assembly, consisting of a larger pan surrounding a smaller pan; both pans being comprised of a base and side walls, said larger pan having a glass cover and being completely insulated around said base and walls by polyurethane resin insulation material which traps hot air around the smaller uninsulated pan; said smaller pan containing water and a glass cover; said water in the small pan filled almost to the top, but having an air gap between it and the glass cover; said pan assembly tilted to face toward the sun; the means for tilting the pan assembly being earth graded at an approximate ten degree rise; means for filling the small pan with water comprising a small inlet pipe which enters through the base of the small pan, the base of the large pan and the insulation, and welded to the base of the small pan; means for emptying water from the small pan comprising a small outlet pipe which enters through the base of the small pan, the base of the large pan and the insulation, and welded to the base of the small pan; said pans being made of aluminum containing alloys which will make the inside surfaces turn black when oxidized in the presence of water and sunlight.

3. A heat accumulator for collecting solar energy in a liquid, which comprises a small metal pan containing a liquid set inside a much larger empty metal pan; said larger pan exposing a considerable amount of bare metal to sunlight; both pans being comprised of a base and side walls and enclosed respectively by glass covers mounted on the top of said side walls; said larger pan completely enclosing the side walls and top of said small pan and forming an airgap around it; the base of said small pan being in contact with the base of said larger pan so that additional solar heat will be conducted to the water in the small pan from the larger pan; the side walls of said small pan being exposed to hot air trapped around them by said larger pan so that the water in the small pan will be additionally heated through convection; sunlight beaming through the glass cover of said small pan heating the water through radiation; said larger pan having the exterior of its base and side walls covered with insulation; both small and large pan having a black interior surface; means for introducing a liquid into the small pan, and means for removing heated liquid from the small pan.

References Cited by the Examiner

UNITED STATES PATENTS

| | | | |
|---|---|---|---|
| 629,122 | 7/1899 | Davis | 126—271 |
| 1,130,870 | 3/1915 | Willsie | 126—271 X |
| 1,673,429 | 6/1928 | Vinson | 126—271 |
| 2,519,281 | 8/1950 | Presser et al. | 126—271 |
| 3,076,450 | 2/1963 | Gough et al. | 126—271 |
| 3,145,707 | 8/1964 | Thomason | 126—271 |
| 3,146,774 | 9/1964 | Yellott | 126—271 |

FOREIGN PATENTS 821,237  10/1959  Great Britain.

CHARLES J. MYHRE, *Primary Examiner.*

JAMES W. WESTHAVER, *Examiner.*